(12) United States Patent
Zhou et al.

(10) Patent No.: US 9,903,102 B2
(45) Date of Patent: Feb. 27, 2018

(54) CONCEALED EMBEDDED COMPONENT FOR A WATERWAY SYSTEM

(71) Applicants: XIAMEN SOLEX HIGH-TECH INDUSTRIES CO., LTD., Xiamen (CN); Huasong Zhou, Xiamen (CN)

(72) Inventors: Huasong Zhou, Xiamen (CN); Qiang Wang, Xiamen (CN); Shaohui Zhou, Xiamen (CN); Lihong Hu, Xiamen (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 0 days.

(21) Appl. No.: 15/107,400

(22) PCT Filed: Dec. 26, 2014

(86) PCT No.: PCT/CN2014/095155
§ 371 (c)(1),
(2) Date: Jun. 22, 2016

(87) PCT Pub. No.: WO2015/096811
PCT Pub. Date: Jul. 2, 2015

(65) Prior Publication Data
US 2017/0002551 A1    Jan. 5, 2017

(30) Foreign Application Priority Data

Dec. 27, 2013  (CN) .......................... 2013 1 0743887
Dec. 27, 2013  (CN) ..................... 2013 2 0881823 U

(51) Int. Cl.
*E03C 1/02*    (2006.01)
*E03C 1/04*    (2006.01)
*F16K 17/04*   (2006.01)

(52) U.S. Cl.
CPC .............. *E03C 1/021* (2013.01); *E03C 1/023* (2013.01); *E03C 1/04* (2013.01); *F16K 17/04* (2013.01);
(Continued)

(58) Field of Classification Search
CPC ......... Y10T 137/8158; Y10T 137/6988; Y10T 137/6995; Y10T 137/6999;
(Continued)

(56) References Cited

U.S. PATENT DOCUMENTS 2,952,271 A * 9/1960 Dick ....................... D06F 39/08
                                                137/360
3,912,106 A * 10/1975 Traupe .................... E04F 19/08
                                                174/482

(Continued)

FOREIGN PATENT DOCUMENTS

CN          102269282 A     12/2011
CN          202927126 U      5/2013
(Continued)

*Primary Examiner* — Craig Schneider
*Assistant Examiner* — Kevin Barss
(74) *Attorney, Agent, or Firm* — Rabin & Berdo, P.C.

(57) ABSTRACT

A concealed embedded component for a waterway system includes a lower main body with a cool water inlet passage, a hot water inlet passage, a mixing water passage and at least an outlet passage; an embedded box including a box body and a fixing frame covering the box body; a water testing element with the bottom surface disposed with a first passage and a second passage. The lower main body is disposed in the box body, the water testing element is disposed in the box body, the water testing element covers the lower main body to constitute the outlet passage, and the mixing water passage is connected to the cool water inlet passage or the hot water inlet passage. Since the lower main body is disposed in the box body and is separated from concrete, it is convenient to disassemble the concealed embedded component for maintenance.

14 Claims, 7 Drawing Sheets

(52) U.S. Cl.
CPC .... *Y10T 137/6988* (2015.04); *Y10T 137/6995* (2015.04); *Y10T 137/6999* (2015.04)

(58) Field of Classification Search
CPC ... Y10T 137/7025; E03C 1/023; E03C 1/021; E03C 1/04
USPC ....................................................... 52/220.1
See application file for complete search history.

(56) References Cited

U.S. PATENT DOCUMENTS

| | | | | |
|---|---|---|---|---|
| 6,125,881 | A * | 10/2000 | Hobbs | D06F 39/08 137/360 |
| 7,823,846 | B2 * | 11/2010 | Williams, III | F16L 5/00 248/200.1 |
| 8,020,575 | B1 * | 9/2011 | Watson | E03B 7/072 137/15.13 |
| 2009/0173397 | A1 * | 7/2009 | Mallela | E03B 7/095 137/364 |
| 2010/0077681 | A1 * | 4/2010 | McCleskey | H02G 3/088 52/220.1 |
| 2010/0192490 | A1 * | 8/2010 | Chang | F16L 5/14 52/220.1 |
| 2012/0042963 | A1 * | 2/2012 | Sanzone | E03C 1/021 137/315.01 |

FOREIGN PATENT DOCUMENTS

| | | |
|---|---|---|
| CN | 103292033 A | 9/2013 |
| CN | 103669495 A | 3/2014 |
| CN | 203654394 U | 6/2014 |
| JP | H11200439 A | 7/1999 |
| JP | 4684937 B2 | 5/2011 |
| WO | WO-2010007511 A1 | 1/2010 |

* cited by examiner

CONCEALED EMBEDDED COMPONENT FOR A WATERWAY SYSTEM

FIELD OF THE INVENTION

The present invention relates to an embedded device of waterway system of the house, especially to a concealed embedded component.

BACKGROUND OF THE INVENTION

It need to preset the waterway system during house building, that is to say, it needs to embed the pipes to the wall before renovation, the pipe has to be disposed with an assembly portion exposed out of the wall. The outlet device is directly connected to the assembly portion of the pipe when undergoing the renovation.

However, the assembly portion of the pipe of the traditional waterway system is exposed that it not only occupies space to influence the visual effect, but also makes it difficult to disassemble to maintain as the assembly portion is directly connected to the concrete by pouring.

SUMMARY OF THE INVENTION

The present invention is provided with a concealed embedded component, which overcomes the disadvantages of the existing technology. The technical proposal of the present invention is that:

A concealed embedded component, comprising:

a lower main body with a cool water inlet passage, a hot water inlet passage, a mixing water passage and at least an outlet passage, the cool water inlet passage, the hot water inlet passage, the mixing water passage and the outlet passage are respectively disposed with an inlet and an outlet;

an embedded box, comprising a box body and a fixing frame covering the box body, the side wall of the box body is disposed with a cool water hole, a hot water hole and at least an outlet hole;

a water testing element with the bottom surface disposed with a first passage and a second passage;

the lower main body is disposed in the box body, the inlet of the cool water inlet passage is aligned with the cool water hole, the inlet of the hot water inlet passage is aligned with the hot water hole, the outlet of the outlet passage is aligned with the outlet hole;

the water testing element is disposed in the box body, the water testing element covers the lower main body to make the outlet passage, the mixing water passage connected to the cool water inlet passage or the hot water inlet passage.

In another preferred embodiment, the fixing frame comprises two insert elements of U-shaped, one end face of the insert element is disposed with a lock portion, the other end face of the insert element is disposed with a lock groove, the external surface of the box body is disposed with at least two protruding rings, the insert element is embedded to two adjacent protruding rings, the lock portion of one insert element is inserted to the lock groove of the other insert element.

In another preferred embodiment, the internal side surface of the insert element is disposed with a guiding column, the external surface of the box body is concaved with a position hole, the guiding column is inserted to the position hole.

In another preferred embodiment, the external surface of the box body is disposed with four protruding rings.

In another preferred embodiment, the external surface of the box body is disposed with a plurality of annular cut marks, the cut marks are disposed at the protruding rings.

In another preferred embodiment, the cut marks are parallel arranged with space.

In another preferred embodiment, the side wall of the box body is disposed with data line interface.

In another preferred embodiment, the center portion of the cool water inlet passage and the hot water inlet passage are respectively disposed with an adjusting valve to adjust the outlet volume.

In another preferred embodiment, the lower main body is disposed with a reservation outlet to connect to the mixing water passage, the box body is disposed with an outlet port corresponding to the reservation outlet.

In another preferred embodiment, the lower main body is disposed with three outlet passages, the embedded box is disposed with three outlet holes, three outlet holes and the outlet port are respectively disposed at the four side walls of the box body.

In another preferred embodiment, the adjusting valve used to adjust outlet volume comprises a spring and a sealing ring to serve as a check valve, to prevent water from being siphon and flowing backwardly to pollute the water resource and to prevent hot water and cool water mixing due to pressure difference of hot water and cool water.

In another preferred embodiment, the extra cut mark at the external surface of the box body is broke off after assembled.

Compared to the existing known technology, the technical proposal of the present invention has advantages:

1. The lower main body is disposed with a mixing water passage, the corresponding waterway of the main control system of the upper main body can be made easy, the upper main body is made low in the height, it reduces the cost, it also reduces the assembly depth of the product, which prevents the impossibility of assembling due to the limit of the wall depth, the assembly is easier; besides, as the assembly depth of the product is reduced, it can satisfy different cavity wall of wooden structure in different country and area.

2. The lower main body is disposed in the box body and separated from the concrete, it is quite convenient to disassemble for maintenance. The embedded box can be shared by temperature control, electric, single product in the shower head, bathtub, wash basin, it is applicable widely.

3. The water testing element covers the lower main body to connect the outlet passage, the mixing water passage to the hot water inlet passage or the cool water inlet passage, it can pre-test to wash the pipe to remove the dirt during assembling, and to test the sealing performance and pressure resistance of the pipe.

4. The lock portion of one insert element is inserted to the lock groove of the other insert element to realize the lock between two insert element, the structure is simple. The fixing frame is composed of two insert elements of same structure, it can only develop one set of mold, the manufacture costs low, the structure is solid and stable.

5. The position hole is coupled to the guiding column for the insert element to connect to the box body smoothly, it can also enhance the connecting strength of both.

6. There are four protruding rings, it can choose two corresponding protruding rings to use based on the assembly depth, it is convenient to assemble.

7. As the external surface of the box body is disposed with a plurality of annular cut marks, the portion of the box body above the wall or the ceramic after the embedded box is assembled is easily cut off conveniently, so that it can ensure that the end face of the embedded box is parallel to the wall. With the cut marks, it is convenient, labor saving and time saving, the extra portion can be removed conveniently and correctly; at the same time, with the cut marks as reference, the cut could not skewed or deviated.

8. The side wall of the box body is disposed with data line interface that it is convenient to set the circuit system.

9. The central portion of the cool water inlet passage and the hot water inlet passage are respectively disposed with adjust valve to adjust the outlet volume, so that it needn't to turn off the power to assemble the main control system of the upper main body, it can just turn off the adjust valves, and it doesn't need to turn off the power to wash the valve spool, it can just turn off the adjust valve to maintain and wash, after the maintenance, it can turn on the adjust valves without influence the water terminals, the adjust valve has non-return function to prevent water from being siphon and flowing backwardly to pollute the water resource and to prevent hot water and cool water mixing due to pressure difference of hot water and cool water, it is designed with humanization.

10. There are three outlet passages, the lower main body satisfies that the central distance of the product in the upper main body is wide, it can be shared by temperature control, electric, single product in the shower head, bathtub, wash basin.

BRIEF DESCRIPTION OF THE DRAWINGS

The present invention will be further described with the drawings and the embodiments.

DETAILED DESCRIPTION OF THE EMBODIMENTS

Figure 1:
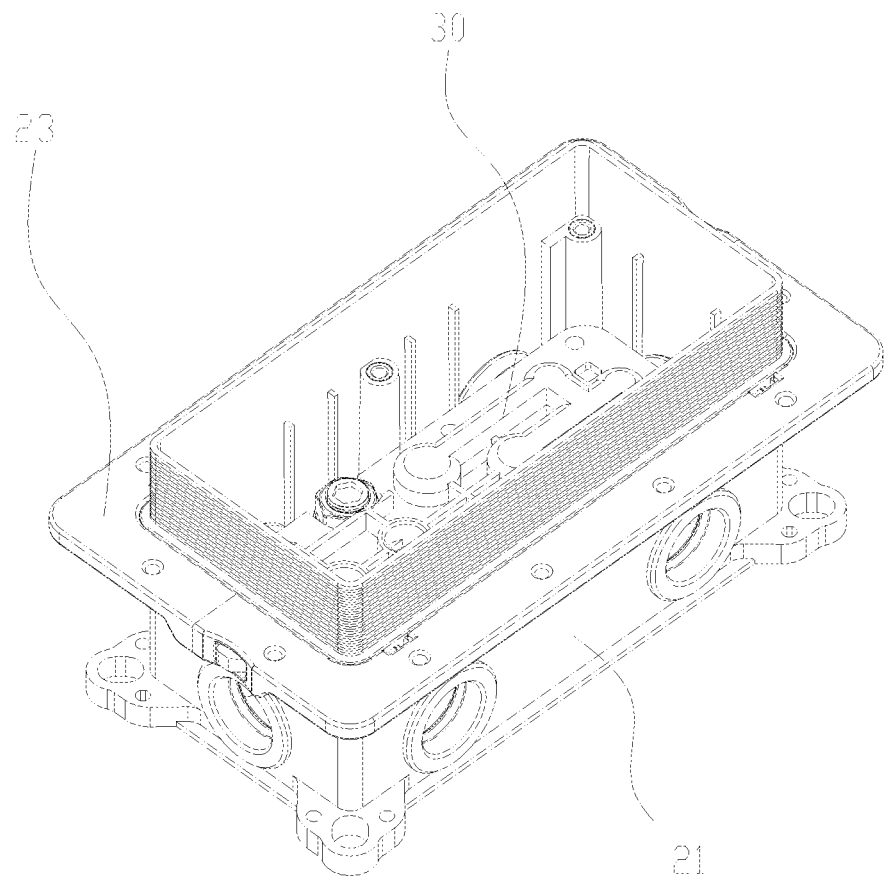
FIG. 1 illustrates a schematic diagram of the concealed embedded component of the present invention.
Figure 2:
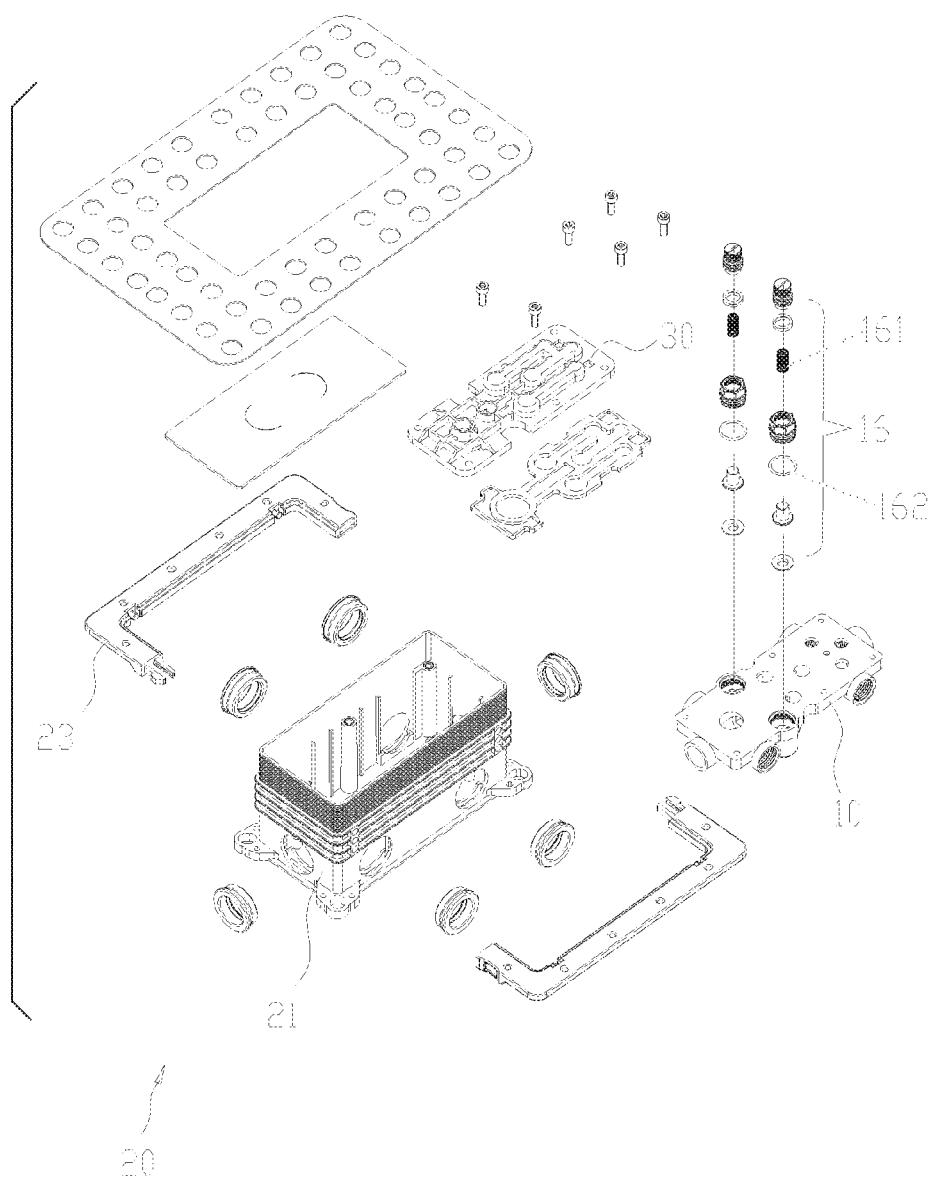
FIG. 2 illustrates an exploded and schematic diagram of the concealed embedded component of FIG. 1.

Referring to FIG. 1 and FIG. 2, a concealed embedded component of the present invention comprises a lower main body 10, an embedded box 20 and a water testing element 30. The lower main body 10 and the water testing element 30 are disposed in the embedded box 20.

Figure 3:
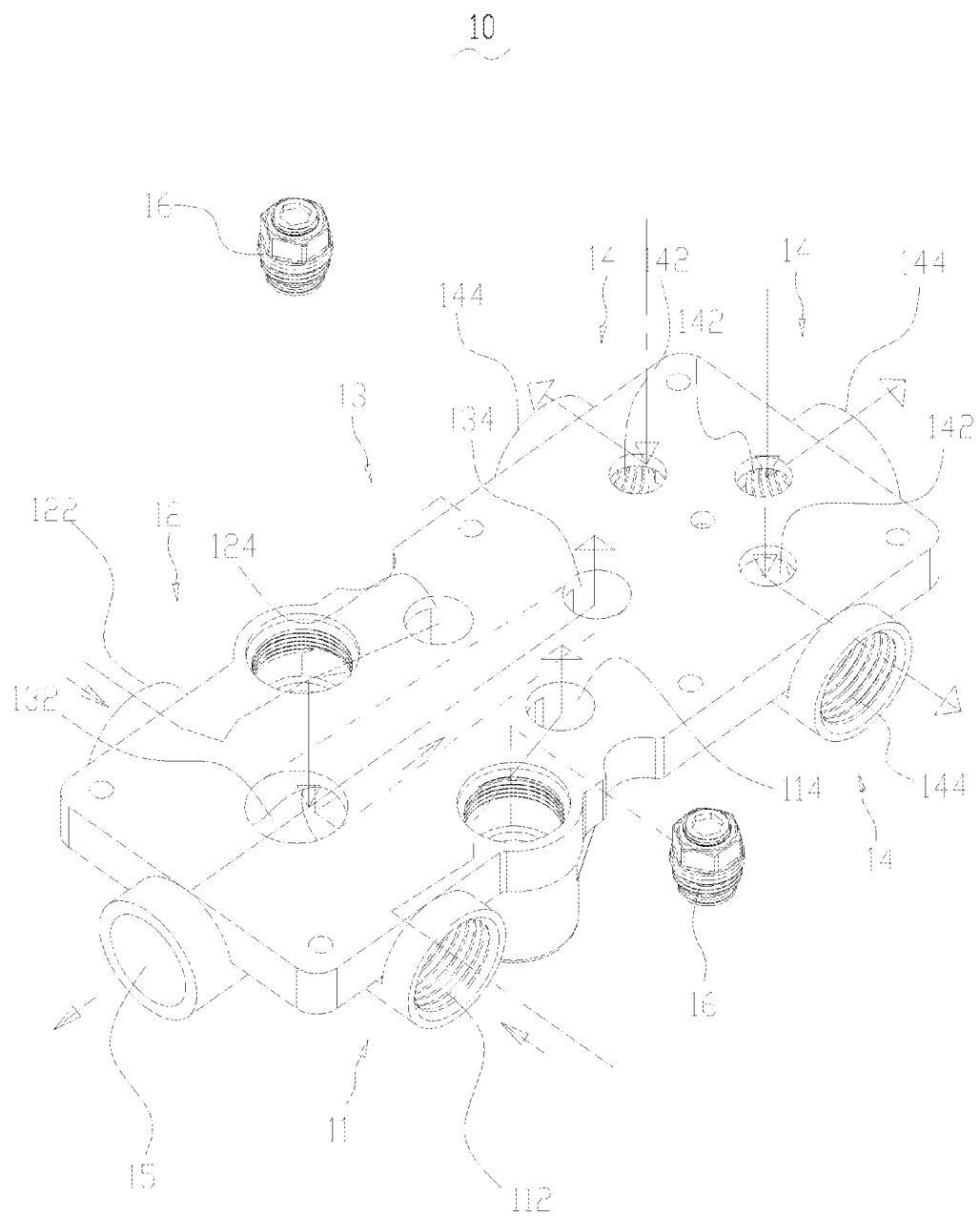
FIG. 3 illustrates a schematic diagram of the lower main body of the concealed embedded component of FIG. 1.

Referring to FIG. 3, the lower main body 10 is disposed with a cool water inlet passage 11, a hot water inlet passage 12, a mixing water passage 13, three outlet passages 14 and a reservation outlet 15.

The cool water inlet passage 11 is disposed with an inlet 112 and an outlet 114. The hot water inlet passage 12 is disposed with an inlet 122 and an outlet 124. The cool water inlet passage 11 and the hot water inlet passage 12 are respectively disposed at the left and the right side of the lower main body 10. The central portion of the cool water inlet passage 11 and hot water inlet passage 12 are respectively disposed with an adjusting valve 16 to adjust the outlet volume. By adjusting the adjust valves 16, the cool water inlet passage 11 and the hot water inlet passage 12 can be open and closed. The adjust valve 16 comprises a spring 161, a sealing ring 162, etc, it can realize non-return to prevent water from being siphon and flowing backwardly to pollute the water resource and to prevent hot water and cool water mixing due to pressure difference of hot water and cool water.

The mixing water passage 13 is a straight pipe, the upper surface of the lower main body is disposed with an inlet 132 and an outlet 134.

The outlet passage 14 is an L-shaped pipe with an inlet 142 and an outlet 144. The reservation outlet 15 is connected to the mixing water passage 13. The reservation outlet 15 is near to the inlet 132 of the mixing water passage 13. The reservation outlet 15 and the outlets of the three outlet passages 14 are respectively disposed at four sides of the lower main body 10.

The cool water flows from the inlet 112 of the cool water inlet passage 11 and flows out of the outlet 114 of the cool water inlet passage 11 to enter the first control valve at the upper portion of the lower main body 10; the hot water flows from the inlet 122 of the hot water inlet passage 12 and flows out of the outlet 124 of the hot water inlet passage to enter the first control valve; the cool water and the hot water are mixed in the first control valve in certain proportion and flow to inlet 132 of the mixing water passage 13, a portion of the mixing water flows out of the reservation outlet 15, another portion of the mixing water flows to the second control valve at the upper portion of the lower main body from the outlet 134 of the mixing water passage 13, the second control valve can alternatively make the mixing water flow to one or more than one outlet passages 14.

It can be noted that, the first control valve can be a temperature control valve or a main control valve, the second control valve can be a main control valve or a switch valve.

Figure 4:
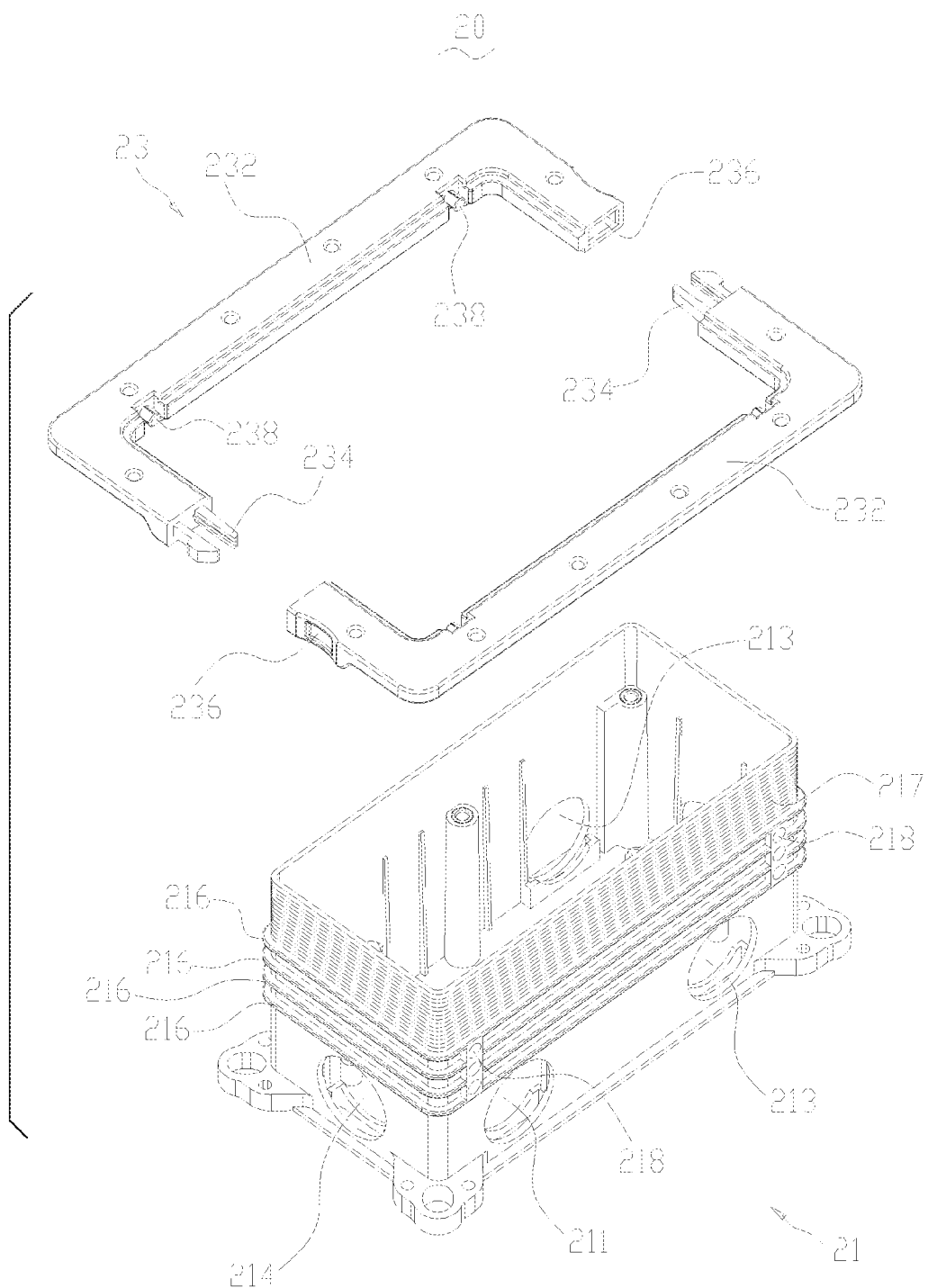
FIG. 4 illustrates an exploded and schematic diagram of the embedded box of the concealed embedded component of FIG. 1.
Figure 5:
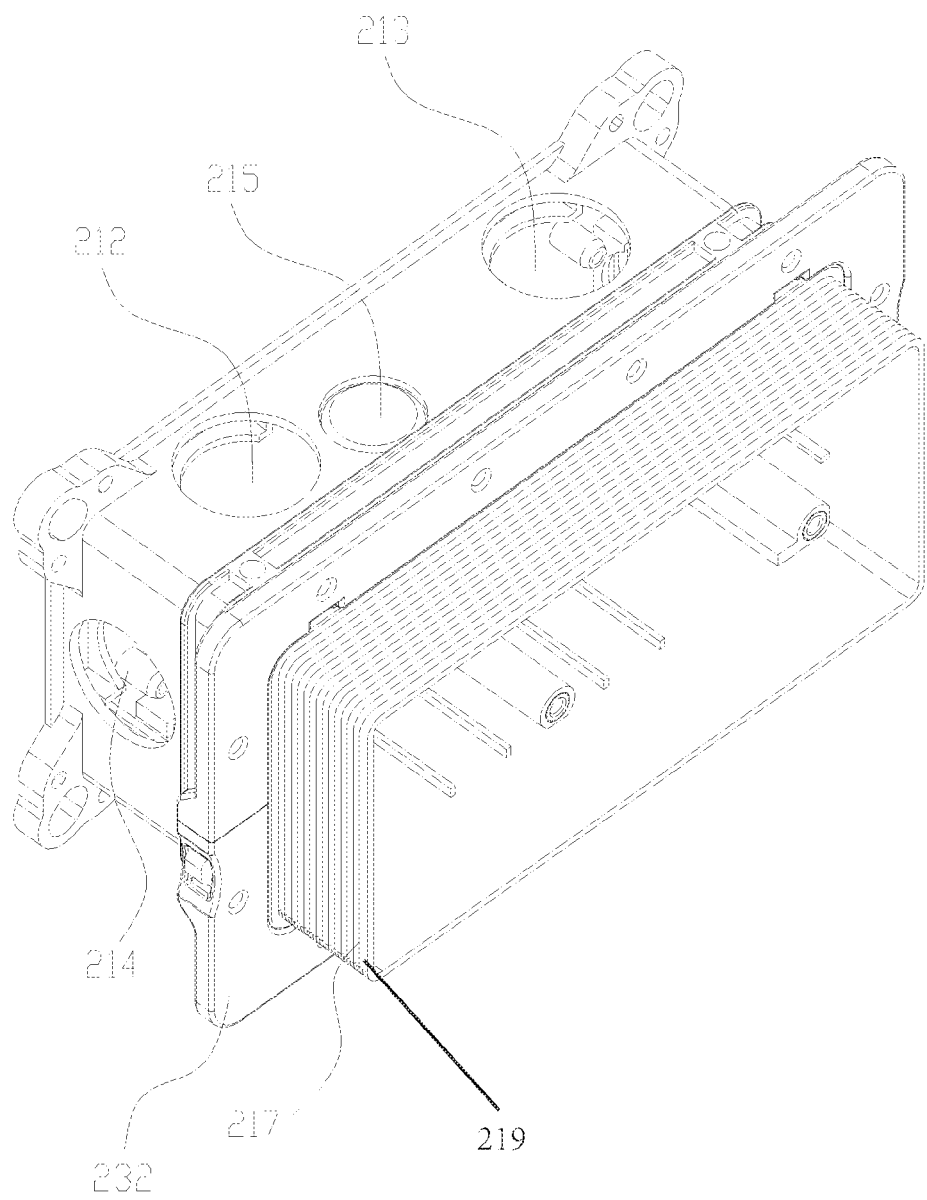
FIG. 5 illustrates a schematic diagram of the embedded box of FIG. 4.

Referring to FIG. 4 and FIG. 5, the embedded box 20 comprises a box body 21 and a fixing frame 23.

The box body 21 is used to hold the lower main body 10 and the water testing element 30. The box body 21 is a case structure with the top portion opening. A cool water hole 211, a hot water hole 212, three outlet holes 213, an outlet interface 214, a data line interface 215 are disposed at the side walls of the box body 21. The three outlet holes 213 and the outlet interface 214 are disposed at two opposite side walls. Three outlet holes 213 and the outlet interface 214 are respectively disposed at the four side walls. The external surface of the box body 21 is disposed with four protruding rings 216 arranged with equal space. Two adjacent protruding rings 216 are used to fix the fixing frame 23. The external surface of the box body 21 is disposed with a plurality of annular cut marks 217, the cut marks 217 are parallel disposed at the protruding rings 216 with equal space. The box body 21 is disposed with position holes 218 at two adjacent protruding rings 216. There are four position holes 218 at two adjacent protruding holes 216, there are two position holes 218 at the side wall the cool water hole 211 located and two position holes 218 at the side wall the hot water hole 212 located.

The fixing frame 23 comprises two insert elements 232. The insert element 232 is U-shaped. One end face of the insert element 232 is disposed with a lock portion 234, the other end face of the insert element 232 is disposed with a lock groove 236. The internal side surface of the insert element 232 is disposed with two guiding columns 238. The two insert elements 232 are embedded to two adjacent protruding rings 216, the lock portion 234 of one insert element 232 is inserted to the lock groove 236 of the other insert element 232. The guiding columns 238 of each insert element 232 are inserted to the corresponding position holes 218. So that the fixing frame can cover the fix body 21. It can choose a different number of the protruding rings 216 based on the assembly depth. The insert element 232 is fixedly connected to the cavity wall or the stand column to position the box body 21.

Referring to FIGS. 3-5, the lower main body 10 is disposed in the box body 21, the cool water hole 211 is aligned with the inlet 112 of the cool water inlet passage 11; the hot water hole 212 is aligned with the inlet 122 of the hot water inlet passage 12; three outlet holes 213 are respectively aligned with the outlets 134 of the three outlet passages 14; the outlet interface 214 is aligned with the reservation outlet 15.

Figure 6:
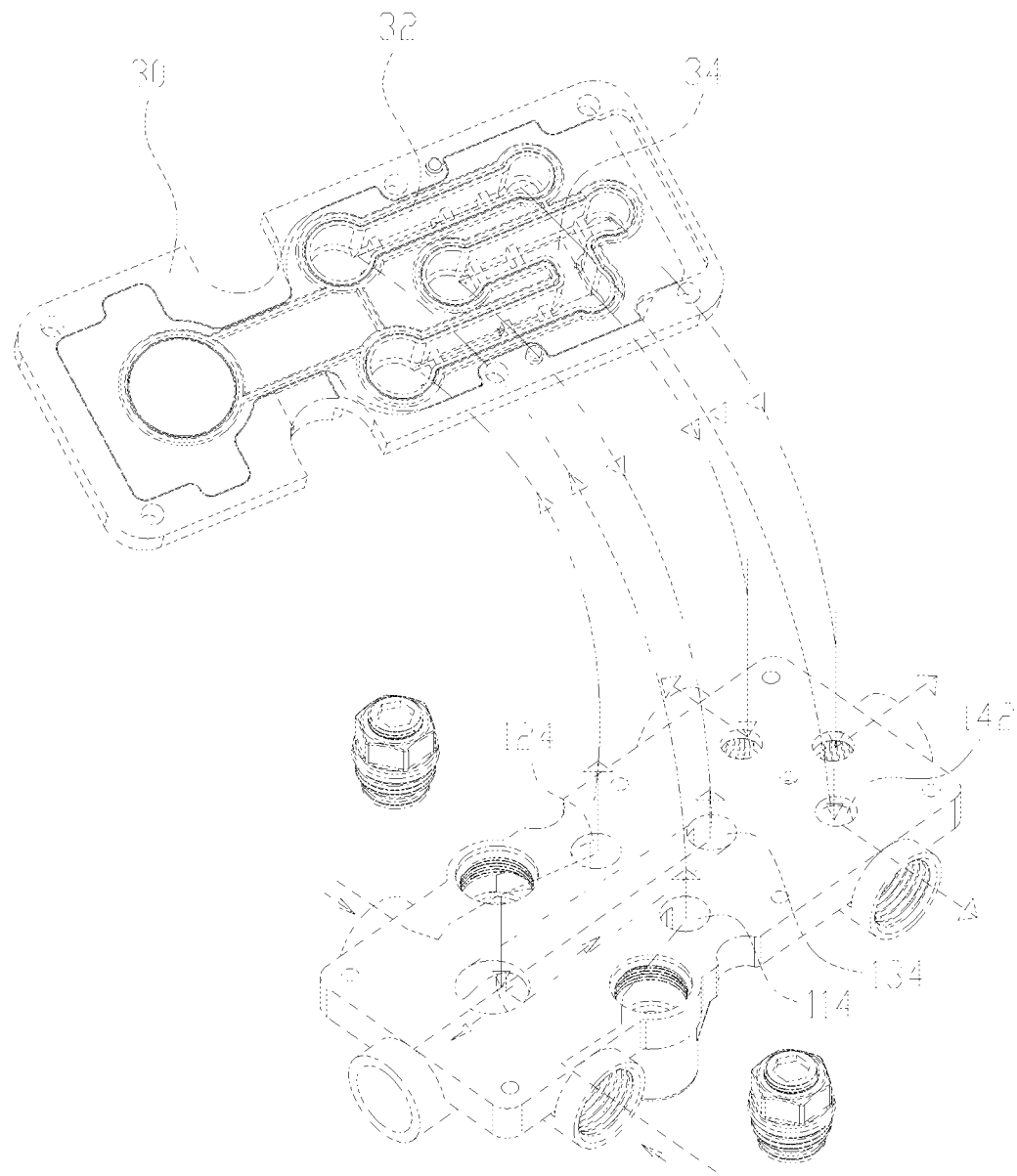
FIG. 6 illustrates a schematic diagram of the connecting of the water testing element and the lower main body of the embedded component of FIG. 1.
Figure 7:
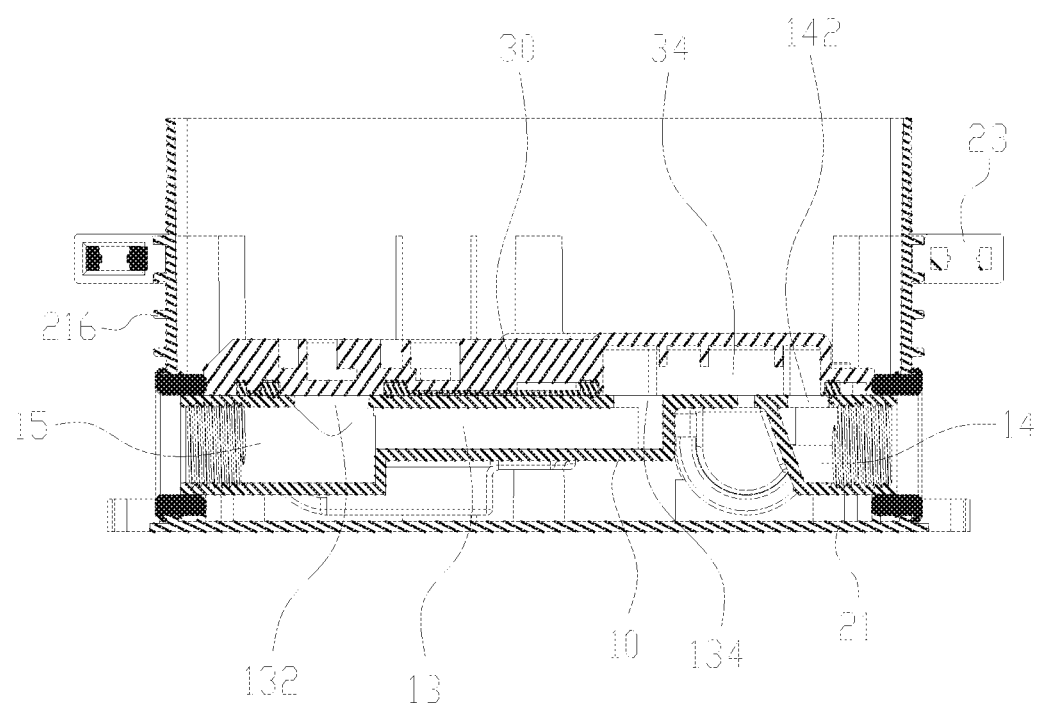
FIG. 7 illustrates a sectional diagram of the concealed embedded component of the present invention.

Referring to FIG. 6 and FIG. 7, the bottom surface of the water testing element 30 is disposed with a first passage 32 and a second passage 34.

The water testing element 30 is disposed in the box body 21, the water testing element 30 covers the lower main body 10. The first passage 32 connects the outlet 114 of the cool water inlet passage 11 and the inlet 142 of one outlet passage 14; the second passage 34 connects the outlet 124 of the hot water inlet passage 12 and the inlets 142 of the other two outlet passages 14 and the outlet 134 of the mixing water passage 13.

As the external surface of the box body is disposed with cut marks 217, the portion of the box body above the wall or the ceramic after the embedded box is assembled is easily cut off conveniently, so that it can ensure that the end face of the embedded box is parallel to the wall. With the cut marks, it is convenient, labor saving and time saving, the extra portion, e.g., extra cut mark 219, can be removed conveniently and correctly; at the same time, with the cut marks as reference, the cut could not skewed or deviated.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided with a concealed embedded component, the lower main body of which is disposed in the box body to be separated from the concrete, it is convenient to disassemble for maintenance. The embedded box can be shared by temperature control, electric, single product in the shower head, bathtub, wash basin, it is applicable widely with well industrial applicability.

The invention claimed is:

1. A concealed embedded component for a waterway system in a structure, comprising:
a lower main body including a cool water inlet passage; a hot water inlet passage; a mixing water passage; and at least an outlet passage, the cool water inlet passage, the hot water inlet passage, the mixing water passage and the outlet passage being respectively provided with an inlet and an outlet;
an embedded box comprised of a box body; and a fixing frame covering the box body, a side wall of the box body being provided with a cool water hole; a hot water hole; and at least an outlet hole;
a water testing element having a bottom surface provided with a first passage and a second passage,
wherein the lower main body is disposed in the box body, the inlet of the cool water inlet passage is aligned with the cool water hole, the inlet of the hot water inlet passage is aligned with the hot water hole, the outlet of the outlet passage is aligned with the outlet hole, and
wherein the water testing element is disposed in the box body, the water testing element covers the lower main body to constitute said outlet passage, and the mixing water passage is connected to the cool water inlet passage or the hot water inlet passage.

2. The concealed embedded component according to claim 1, wherein the fixing frame comprises two insert elements both of which have a U-shape, one end face of each of the two the insert elements being provided with a lock portion, another end face of each of the two insert elements being provided with a lock groove, the box body having an external surface that is provided with at least two protruding rings, one insert element of the two insert elements being embedded in two adjacent protruding rings, and the lock portion of one insert element being inserted into the lock groove of the another insert element.

3. The concealed embedded component according to claim 2, wherein the two insert elements each have an internal side surface that is provided with a guiding column, the box body has an external surface that is concaved with a position hole, and the guiding column is inserted into the position hole.

4. The concealed embedded component according to claim 2, wherein the body box has an external surface that is provided with four protruding rings.

5. The concealed embedded component according to claim 2, wherein the body box has an external surface that has defined therein a plurality of annular cut marks that are disposed at the at least two protruding rings.

6. The concealed embedded component according to claim 5, wherein the plurality of annular cut marks are arranged in parallel with one another and spaced apart from one another.

7. The concealed embedded component according to claim 1, wherein the box body has a side wall that is disposed with a data line interface.

8. The concealed embedded component according to claim 1, wherein the cool water inlet passage has a center portion, and wherein the center portion of the cool water inlet passage and the hot water inlet passage are respectively provided with an adjusting valve to adjust outlet volume.

9. The concealed embedded component according to claim 1, wherein the lower main body is provided with a reservation outlet connected to the mixing water passage, and the box body is provided with an outlet port corresponding to the reservation outlet.

10. The concealed embedded component according to claim 9, wherein the box body has four side walls, the lower main body is provided with three outlet passages, the embedded box is provided with three outlet holes, and the three outlet holes of the embedded box and the outlet port of the box body are respectively disposed at the four side walls of the box body.

11. The concealed embedded component according to claim 8, wherein the adjusting valve used to adjust outlet volume comprises a spring; and a sealing ring which serve as a check valve to prevent water from being siphoned and flowing backwardly to pollute the water resource and to prevent hot water and cool water from mixing due to a pressure difference between the hot water and the cool water.

12. The concealed embedded component according to claim 5, wherein at the external surface of the box body has at least one extra cut mark of the plurality of annular cut marks and the at least one extra cut mark is configured for being broken off after assembly.

13. The concealed embedded component according to claim 8, wherein the lower main body is provided with a reservation outlet connected to the mixing water passage, and the box body is provided with an outlet port corresponding to the reservation outlet.

14. The concealed embedded component according to claim 13, wherein the box body has four side walls, the lower main body is provided with three outlet passages, the embedded box is provided with three outlet holes, and the three outlet holes of the embedded box and the outlet port of the box body are respectively disposed at the four side walls of the box body.

* * * * *